United States Patent [19]

Gingerich et al.

[11] 4,214,895

[45] Jul. 29, 1980

[54] METHOD FOR PRODUCING COBALT METAL POWDER

[75] Inventors: Richard G. W. Gingerich; Clarence D. Vanderpool, both of Towanda; Mary A. Fedorchak, Rome; Joseph E. Ritsko, Towanda; Michael J. Cheresnowsky, Towanda, all of Pa.

[73] Assignee: GTE Sylvania Incorporated, Stamford, Conn.

[21] Appl. No.: 38,971

[22] Filed: May 14, 1979

[51] Int. Cl.$^2$ .............................................. C22B 23/04
[52] U.S. Cl. ................... 75/0.5 AA; 75/119; 423/143
[58] Field of Search .............. 75/0.5 AA, 119; 423/143

[56] References Cited

U.S. PATENT DOCUMENTS

| 2,826,499 | 3/1958 | Schlecht et al. | 75/119 X |
| 2,879,137 | 3/1959 | Bare et al. | 75/119 X |
| 3,928,530 | 12/1975 | Bakker et al. | 75/119 X |
| 3,933,976 | 1/1976 | Nikolic et al. | 423/144 |
| 4,093,450 | 6/1978 | Doyle et al. | 75/0.5 AA |
| 4,108,640 | 8/1978 | Wallace et al. | 75/0.5 AA |

FOREIGN PATENT DOCUMENTS 1583864 2/1972 Fed. Rep. of Germany.
2319703 10/1973 Fed. Rep. of Germany.

Primary Examiner—G. Ozaki
Attorney, Agent, or Firm—Robert E. Walter

[57] ABSTRACT

Fine particle size cobalt metal powder is prepared by treating an aqueous solution of a soluble cobaltic ammine halide with a sufficient amount of a soluble metallic hydroxide to form a cobalt containing precipitate. The precipitate is separated from the solution and reduced in a reducing atmosphere to produce metallic cobalt.

14 Claims, No Drawings

METHOD FOR PRODUCING COBALT METAL POWDER

CROSS REFERENCE TO RELATED APPLICATIONS

Co-pending applications relating to the production of fine metal cobalt filed concurrently herewith include Ser. No. 038,973 relating to mother liquor treatment, Ser. No. 038,968 utilizing an ion exchange resin during cobalt liquor processing, Ser. No. 038,972 including an ammonia recycling step, and Ser. No. 038,970 relating to producing cobaltic hexammine complex as an intermediate step.

TECHNICAL FIELD

This invention relates to the production of fine cobalt metal powder from an impure cobalt source, and more particularly relates to the process for obtaining such powder by the hydrogen reduction of a precipitate obtained from an aqueous solution containing cobalt.

Fine cobalt powder of high purity is typically used in the manufacture of cemented carbide cutting tools, magnetic tapes, and magnetic inks.

BACKGROUND OF THE INVENTION

According to German Patent No. 2,319,703, it is known to separate cobalt from nickel by a process which includes forming pentammine sulfate complexes of the two ions in solution. However, it has been found that soluble cobalt ammine sulfates can only be reduced while still in solution, under pressure, and with the aid of catalysts. Furthermore, the resulting cobalt powder is not fine particle size.

U.S. Pat. No. 4,093,450 to Doyle et al. describes a process for producing fine particle size cobalt metal powder by the hydrogen reduction of cobalt oxide obtained from a cobalt pentammine carbonate solution. The precipitate was formed by heating the solution to drive off ammonia and carbon dioxide to form a precipitate of cobalt oxide. This process requires a solution of approximately four grams per liter of cobalt to produce a metal powder having a particle size less than one micron. Note that the final resulting particle size is less than one micron is highly dependent on the concentration of cobalt employed in the aqueous solution.

The following patents are directed to the separation of cobalt from other cations, especially nickel. The resulting cobalt compounds are not disclosed as being sources for forming fine particle size cobalt.

U.S. Pat. No. 2,879,137 to Bare et al. discloses the treatment of an ammoniacal ammonium carbonate solution obtained from leaching an ore and containing nickel wherein the cobalt present in the cobaltic state is treated with an alkali metal or alkaline earth metal hydroxide under controlled temperature conditions to precipitate the nickel free of cobalt.

U.S. Pat. No. 3,928,530 to Bakker et al. discloses a process for the separation of nickel and cobalt by forming pentammine chloride complexes in solution containing a high concentration of ammonium chloride, and precipitating cobalt pentammine chloride.

In German Patent No. 1,583,864, cobalt is recovered from scrap by digestion of the scrap in HCl and $MgCl_2$ solution, followed by removal of iron and chromium impurities by precipitation at a moderately acid pH followed by extracting a cobalt chloride complex with a long chain tertiary ammine in an aromatic solvent.

U.S. Pat. No. 4,108,640 to Wallace discloses a process for recovering metallic cobalt from an aqueous ammoniacal solution wherein the solution is contacted with a water immiscible liquid ion exchange reagent dissolved in an inert organic diluent to selectively extract the other metal from the solution and produce an organic extract loaded with the other metals and an aqueous cobalt bearing raffinate substantially free of the other metals.

SUMMARY OF THE INVENTION

It is an object of the present invention to provide the new process for forming fine metallic cobalt particles.

It is another object of the present invention to provide a process which can be used to effectively form fine cobalt powder over a wide range of concentrations of cobalt in the initial solution.

Other and further objects of the present invention will become apparent from the following description.

In accordance with the present invention, there is provided a method for producing fine particles of cobalt metal powder comprising treating an aqueous solution of a soluble cobaltic ammine halide with a sufficient amount of a soluble metallic hydroxide to form a cobalt containing precipitate, separating the cobalt containing precipitate from the resulting solution, and reducing said cobalt containing precipitate to form fine particles of cobalt.

DETAILED DESCRIPTION

Fine particle size cobalt, typically having a Fisher Sub Sieve Size (FSSS) from about 0.5 to about 3.0, is produced directly by the reduction of a cobalt containing precipitate which is formed by treating an aqueous solution of a soluble cobaltic ammine halide with a sufficient amount of soluble metallic hydroxide. Based on the weight percent cobalt present in solution, cobaltic ammine halide is preferably present in solution in an amount greater than about 5 percent and more preferably greater than about 15 percent up to the limits of cobaltic ammine halide solubility. Depending on various factors, the solubility limits of various cobaltic ammine halide results in solutions not exceeding about 60 percent by weight cobalt. It is contemplated that the solution containing the soluble cobaltic ammine halide may be derived from a variety of sources. The purity of the resulting metallic cobalt is dependent on the purity of the starting solution in that certain metallic cations which may be regarded as impurities may precipitate with the cobalt and may be present in the final reduced cobalt metallic powder.

It is generally preferred that the cation impurities be present in the solution in an amount less than about 5 percent based on the amount of cobalt present in the solution. Such soluble cations include iron, manganese, copper, aluminum, chromium, magnesium, calcium, etc. For the preparation of cobalt powders to be used in the cemented carbide industry, it is preferable that the cation impurity of the solution be less than about 2 percent based on the cobalt present.

Typical solutions containing cobalt which may be utilized in the present invention may be derived from sludges and leach solutions from cemented carbide or tungsten recovery operations. For those solutions containing the cobaltous ion, oxidation to the cobaltic ion is preferable to result in improved recovery.

According to one process, a cobalt source containing various impurities is digested in hydrochloric acid solution to obtain a solution of about 60 to 150 grams per liter of cobalt in a 1 to 6 molar hydrochloric acid solution. Ammonium hydroxide is added to result in a concentration of about 100 to 150 grams per liter of ammonium chloride at a pH of about 9.0 to 10.0. Air oxidation of the cobaltous ion to cobaltic results in the formation of cobaltic ammine ions. At least a portion of the cobaltic ammine ions are preferably present in the form of cobaltic hexammine and cobaltic pentammine having the formula $Co(NH_3)_6{+++}$ and $Co(NH_3)_5X{++}$ wherein X is a halogen or hydroxide.

In accordance with the present invention, the aqueous solution containing the soluble cobaltic ammine halides may be treated with a sufficient amount of a soluble metallic hydroxide to form a cobalt containing precipitate without further purification. It is preferable to reduce the cation impurities by further purification of the solution. According to one such method, a solution which has been formed by the digestion of the cobalt source in hydrochloric acid according to the above method and containing cobalt ammine ions may be treated with a sufficient amount of hydrochloric acid to reduce the pH to less than about 1.0 to precipitate chloropentamminecobalt(III) dichloride and hexamminecobalt(III) trichloride. Filtration of the solution results in the precipitated cobalt ammine halides being separated from the acid solution containing soluble cation impurities.

The crude cobalt ammine halide precipitate may be further purified by subsequent crystallizations wherein the cobaltic ammine halide precipitate is first dissolved in ammonium hydroxide solution, next acidified to produce a cobaltic ammine precipitate, and then is separated from the liquor containing impurities. The cobaltic ammine halide precipitate halide is redissolved to form a solution of increased purity.

The aqueous solution of soluble cobaltic ammine halide of the desired purity is then treated with soluble metallic hydroxide to form a cobalt containing precipitate. Preferably the metallic hydroxide utilized is an alkali metal hydroxide or alkaline metal hydroxide. Even more preferably, alkali metal hydroxides are used since they may be more easily removed from the precipitated product by washing. Sodium hydroxide and potassium hydroxide are even more preferable due to their commercial availability. The metallic hydroxide may be used in any form resulting in its presence or formation in the solution. Metallic hydroxides in solid form or dissolved in aqueous solution have been utilized.

The metallic hydroxide is added in an amount sufficient to form a cobalt containing precipitate from the resulting solution. The desired cobalt containing precipitate generally forms after sufficient metallic hydroxide has been added to give the solution a pH of from about 10 to about 12. The occurrence of a rapid change in the pH is indicative that sufficient metallic hydroxide has been added. It has generally been found that sufficient metallic hydroxide be used so that the hydroxide radical is present in at least a stoichimetric amount to permit the formation of cobalt oxide hydrate.

The metallic hydroxide addition is preferably carried out at a temperature greater than about 50° C. and for a period of time greater than about 15 minutes. It has been discovered that more rapid additions carried out at lower temperatures result in an apparently slower reaction to give mixtures which settled and filtered slowly. Most preferably the metallic hydroxide is added over the period from about 15 minutes to about 9 hours at a temperature from about 80° C. up to a temperature corresponding to the boiling point of the solution.

The cobalt containing precipitate formed preferably has a black coloration. It is believed to be an amorphous hydrated cobaltic compound. Although it is difficult to measure particle size of the precipitate, it appears that particles are from about 10 to about 25 microns in size. Air drying the cobalt containing precipitate at a temperature of about 100° C. results in the formation of particles having an average particle size from about 2 to about 5 microns. These later particles appear to be a hydrated cobaltic oxide having the formula $Co_2O_3.1 H_2O$.

In accordance with the principles of the present invention, the cobalt containing precipitate is reduced to give a fine cobalt metal powder preferably having an average particle size of less than about 2 microns. After separating the cobalt precipitate from the solution, it is heated in a reducing atmosphere for a time and temperature sufficient to reduce the precipitate to the cobalt metal powder. Such a reduction is typically carried out in a hydrogen atmosphere for a time of about 1 to 6 hours at a temperature from about 350° C. to 600° C.

The following examples will further illustrate the specific embodiments of this invention. It should be understood, however, that these examples are given by way of illustration in that limitation. All temperatures are in degrees centigrade and all parts are by weight, unless otherwise indicated.

EXAMPLE 1

One hundred milliliters of a cobalt chloride solution obtained by the digestion of scrap tungsten carbide in hydrochloric acid is diluted with deionized water to a specific gravity of 1.252 and pH of 0 at 22° C., resulting in a concentration of about 115 grams of cobalt chloride per liter of water. Ammonium hydroxide is then added to lower the specific gravity to about 1.038 and to raise the pH to about 9.3 at 50° C. resulting in about 140 milliliters of solution. The solution is then aerated at an air flow rate of about 5 milliliters per minute for three hours after which 3 milliliters of hydrogen peroxide are added and aeration continued for an additional three hours. Three additional milliliters of hydrogen peroxide are then added followed by one additional hour of aeration. The oxidized solution is heated to 90° C. and held at this temperature while about 25 grams of sodium hydroxide pellets are added over a period of about 30 minutes. Near the end of the sodium hydroxide addition the pH of the solution rises to about 11 and a black precipitate is formed during the addition. The precipitated solution is filtered to separate the black precipitate. Final reduction of the precipitate is achieved by loading batches of the precipitate in refractory boats and stoking the boat into a hydrogen reduction furnace at 450° C. at a stoking rate of 10 minutes per boat, resulting in a total reduction time of about 1 and 1½ hours per boat. Fine particles of cobalt result.

EXAMPLE 2

One hundred milliliters of cobalt chloride solution obtained by the digestion of scrap tungsten carbide in hydrochloric acid is diluted with dionized water, treated with ammonium hydroxide, and aerated according to the procedures set forth in Example 1. A resulting oxidized solution is then heated to 90° C. and held for 15 minutes after which 60 milliliters of hydrochloric acid are added to lower the pH to 0.4 at 35° C. The solution is then digested at 90° C. for one hour with agitation. The resulting solution is then slowly cooled to below 70° C. after which it is wrapped and cooled with the aid of cooling water to 35° C. at which temperature the cooling water is removed, agitation is stopped and the precipitate is allowed to settle. A portion of the mother liquor is then decanted. The remaining mother liquor is then filtered to remove the precipitate. Forty-two grams of a crude cobalt pentammine chloride and hexammine chloride are formed. This crude ammine complex is then charged to 500 milliliters of dionized water at about 60° C. With agitation, 50 milliliters of ammonium hydroxide are added to achieve a pH of about 10 to 30° C. The slurry is then heated to about 65° C. until the pentammine and hexammine chloride have dissolved resulting in 550 milliliters of solution having a pH of 9.1. The solution is then filtered and about 30 milliliters of about a 50 percent sodium hydroxide solution is added over about a 30 minute period. The resulting precipitate settles and the mother liquor is decanted. The slurry remaining in the tank is waived to remove sodium by adding about 100 milliliters of dionized water and agitating for about 5 minutes after the slurry has been heated at about 80° C. The precipitate is then again allowed to settle and remove by filtration. The resulting precipitate is reduced to a fine grained cobalt metal powder as set forth in Example 1.

EXAMPLE 3

About 1.3 liters of an aqueous mixture containing 8 grams of cobalt per liter in the form hexamminecobalt-(III) chloride and containing ammonium chloride. The yellow-orange mixture was treated at 92° C. with 0.13 liter of a 50 percent by weight sodium hydroxide solution by a slow addition over a six hour period to give a black precipitate. The black cobalt hydrate precipitate was removed from its mother liquor and washed free of sodium with water and subsequently reduced at 500° C. in a hydrogen atmosphere at 500° C. to yield 8.86 grams of extra fine cobalt powder having a Fisher Sub Sieve Size (FSSS) of 1.24.

EXAMPLE 4

About 0.8 liters of an aqueous solution having a pH of 8.8 at a temperature of 26° C. contained ammonium hydroxide and aquopentamminecobalt(III) chloride at a concentration of 17 grams of cobalt per liter based on the cobalt concentration. About 0.04 liters of an aqueous solution containing 50% by weight sodium hydroxide was added to the above solution to yield a black cobalt oxide hydrade precipitate. The mother liquor was removed; the precipitate washed, and reduced in a manner similar to that set forth in Example 3 to yield a fine cobalt powder.

EXAMPLE 5

Aqueous solutions containing aquopentamminecobalt(III) chloride at concentrations of 20, 30, 40 and 50 grams per liter based on cobalt concentration are prepared. An aqueous solution containing 50 percent by weight sodium hydroxide is slowly added to each of the above solutions until a black precipitate is formed. Each of the black precipitates are separated from their respective solutions and washed. Each precipitate is separately loaded into a hydrogen reduction furnace and reduced. The resulting cobalt powders have Fisher Sub Sieve Sizes from about 1.3 to about 1.4.

While preferred embodiments of this invention have been described and illustrated, it is to be recognized that modifications and variations thereof may be made without departing from the spirit and scope of this invention as described in the appended claims.

INDUSTRIAL APPLICABILITY

The method described and claimed herein is particularly useful in the formation of extra fine particle size cobalt powders of high purity, which is useful, for example, as a starting material in the formation of cemented carbides, e.g., tungsten carbide.

What is claimed is:

1. A method for producing fine cobalt metal powder comprising treating an aqueous solution of a soluble cobaltic ammine halide with a sufficient amount of a soluble metallic hydroxide to form a cobalt containing precipitate, separating the cobalt containing precipitate from the resulting solution, reducing said cobalt containing precipitate to form fine particles of cobalt.

2. A method according to claim 1 wherein said aqueous solution comprises greater than about 5 percent by weight cobalt.

3. A method according to claim 1 wherein said soluble cobaltic ammine halide is selected from the group consisting of cobaltic hexammine halide and cobaltic pentammine halide and mixtures thereof.

4. A method according to claim 1 wherein said aqueous solution comprises greater than about 15 percent by weight cobalt.

5. A method according to claim 1 wherein said metallic hydroxide is an alkali metal hydroxide or alkaline earth metal hydroxide.

6. A method according to claim 5 wherein said metallic hydroxide is an alkali metal hydroxide.

7. A method according to claim 6 wherein said metallic hydroxide is sodium hydroxide or potassium hydroxide.

8. A method according to claim 7 wherein said aqueous solution is treated by adding metallic hydroxide to said solution until said solution has a pH of from about 10 to about 12.

9. A method according to claim 8 wherein metallic hydroxide is present in an amount at least equal to a stoichiometric amount to permit the formation of cobalt oxide hydrate.

10. A method according to claim 8 wherein said addition is carried out at a temperature greater than about 50° C. and for a period of time greater than about 15 minutes.

11. A method according to claim 8 wherein said addition is carried out a temperature greater than about 60° C. up to the boiling point of said solution for a period of time greater than about 30 minutes.

12. A method according to claim 8 wherein said cobalt containing precipitate comprises a black cobalt hydrate in amorphous form.

13. A method according to claim 12 werein said cobalt containing precipitate is reducible to cobalt particles having a particle size less than about 2 microns.

14. A method according to claim 1 wherein said aqueous solution of a soluble cobaltic ammine complex is formed from an aqueous solution comprising cobaltous and cobaltic ion by adding ammonia hydroxide to said solution and oxidizing the cobaltous ion to the cobaltic ion.

* * * * *

UNITED STATES PATENT AND TRADEMARK OFFICE
CERTIFICATE OF CORRECTION

PATENT NO. : 4,214,895

DATED : July 29, 1980

INVENTOR(S) : Richard G.W. Gingerich et al

It is certified that error appears in the above-identified patent and that said Letters Patent are hereby corrected as shown below:

After Assignee, please delete "GTE Sylvania Incorporated" and insert -- GTE Products Corporation --

Signed and Sealed this

Fourth Day of November 1980

[SEAL]

Attest:

SIDNEY A. DIAMOND

Attesting Officer

Commissioner of Patents and Trademarks